July 19, 1949.   R. B. BLACKMAN   2,476,269
MECHANICAL DIFFERENTIATOR FOR SMOOTHING
TARGET TRACKING DATA
Filed Aug. 20, 1945   2 Sheets-Sheet 1
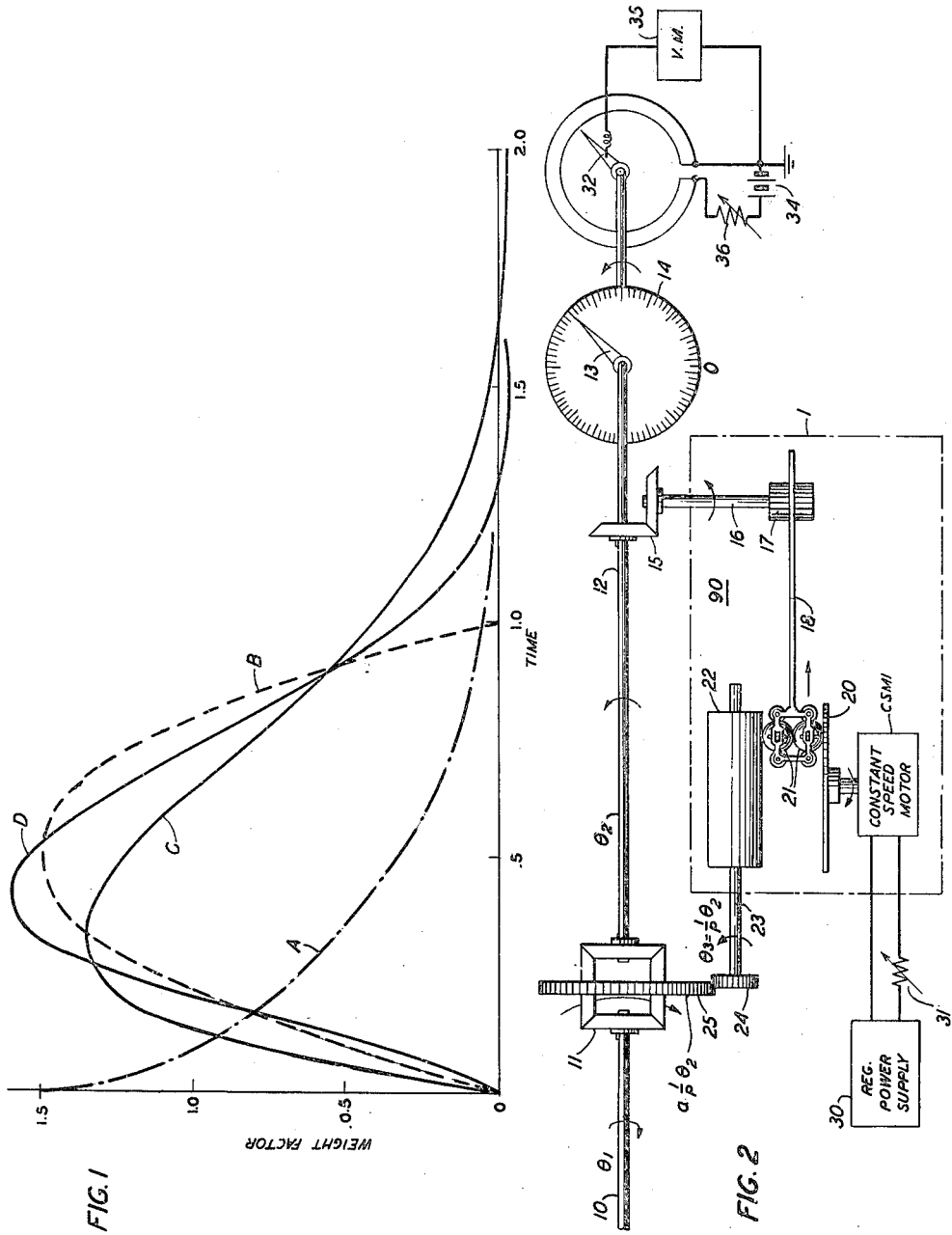
INVENTOR
R. B. BLACKMAN
BY D. MacKenzie
AGENT July 19, 1949.
R. B. BLACKMAN
2,476,269
MECHANICAL DIFFERENTIATOR FOR SMOOTHING
TARGET TRACKING DATA
Filed Aug. 20, 1945
2 Sheets—Sheet 2
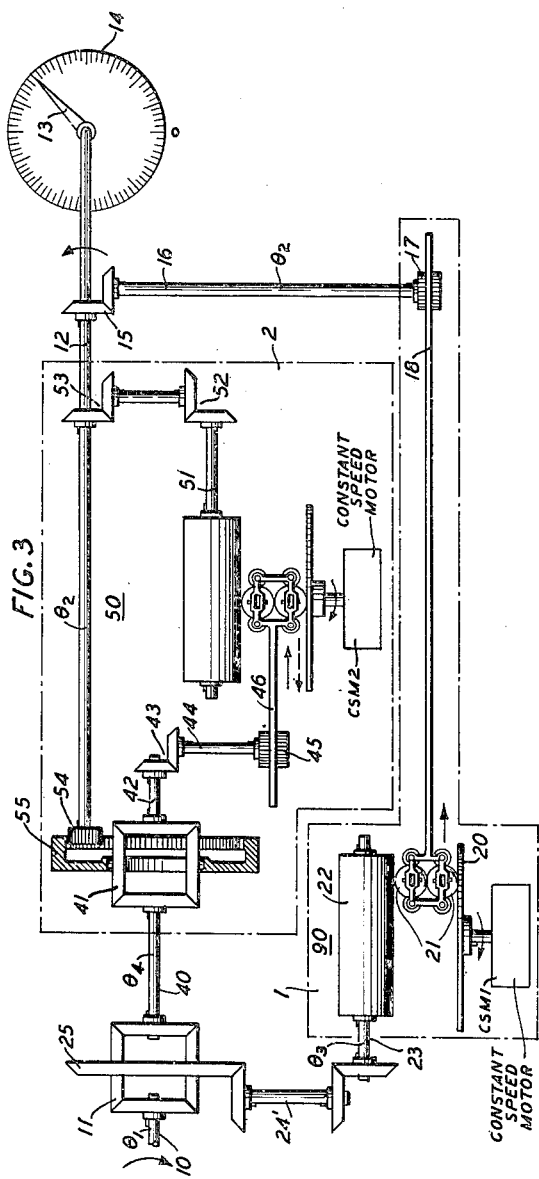
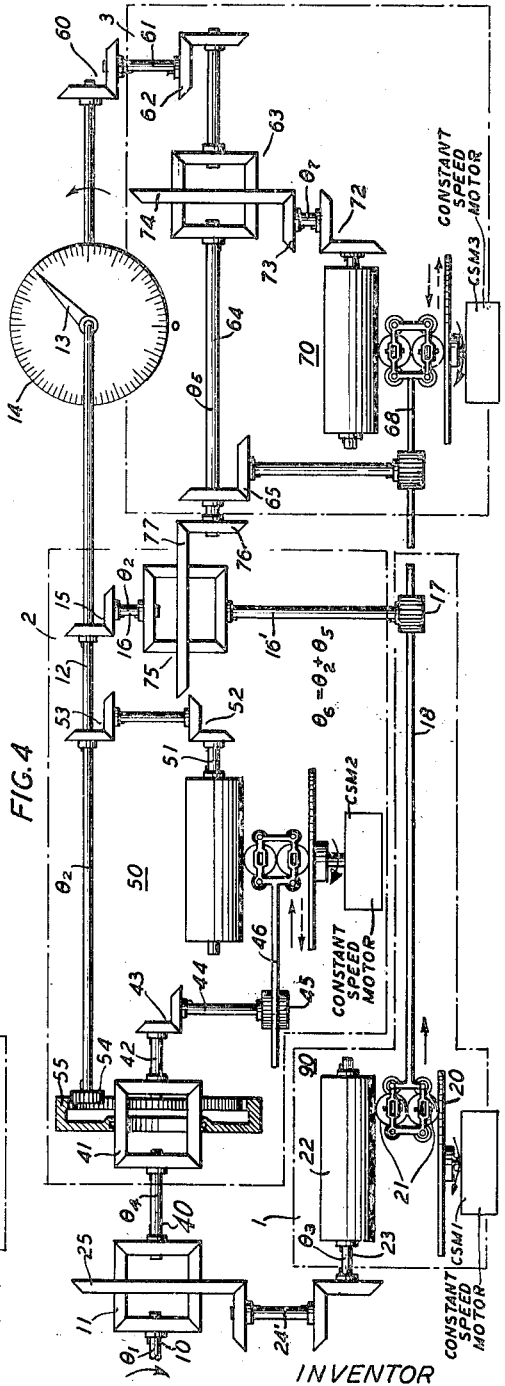
INVENTOR
R. B. BLACKMAN
BY D. MacKenzie
AGENT Patented July 19, 1949

2,476,269

UNITED STATES PATENT OFFICE 2,476,269

MECHANICAL DIFFERENTIATOR FOR SMOOTHING TARGET TRACKING DATA

Ralph B. Blackman, Cranford, N. J., assignor to Bell Telephone Laboratories, Incorporated, New York, N. Y., a corporation of New York Application August 20, 1945, Serial No. 611,639

4 Claims. (Cl. 235—61.5)

This invention relates to an improvement in mechanical differentiators, particularly useful in a mechanical system for indicating an angular velocity.

The general object of the invention is to provide improved means for indicating the angular velocity of a shaft of which the varying angular position and the angular velocity represent respectively the varying value of an observed quantity and the time rate of change thereof.

The observed quantity may be the horizontal displacement of an airplane in flight of which the position is continuously recorded by an observer on the ground. The observer's instruments may themselves be flawless but his use of them is usually affected by random errors of overrunning or underrunning and when a shaft is rotated to follow the value of the observed quantity, the angular position of this shaft does not change uniformly with time even if the observed quantity is so changing. It thus becomes necessary to provide means for measuring the shaft angular velocity and smoothing out the random variations therein.

A further object of the invention is therefore to provide improved means for obtaining a smoothed average of the angular velocity of the rotating shaft by elimination of random errors of observation.

It may be shown by mathematical analysis that if a series of observations of instantaneous angular velocity are averaged over a convenient time interval, the angular velocity being found constant if perfectly observed, this average should be obtained by parabolic weighting of the successive angular velocities; that is, the least weight should be given to the velocities observed at the beginning and at the end, and the maximum weight to those at the center, of the interval. The average velocity so obtained will be identical with that derived from the slope of a straight line fitted by a least squares adjustment to the successive angular shaft positions plotted against time and the random errors alluded to will be filtered out.

Accordingly, it is another object of the invention to provide means for obtaining with approximately parabolic weighting over a convenient time interval the average value over that interval of the angular velocity of a rotating shaft.

While the apparatus of the invention may be made sufficiently complex to approach as closely as desired the ideal parabolic weighting of instantaneous angular velocities, the invention will be set forth with reference to two embodiments which approximate the ideal and constitute improvements over the mechanisms known to the prior art.

The electrical analogue of the mechanical problem is found where the varying observed quantity is represented by a varying voltage which is differentiated with respect to time as, for example, by the differentiating amplifier disclosed by E. L. Norton in United States Patent 2,324,797, July 20, 1943. It is known that an amplifier having a feedback path including an integrating circuit provides an output voltage which is the time derivative of the input voltage. The present invention applies this principle to mechanical differentiators, so that another object of the invention is to provide an improved mechanical transmission system of the type having between input and output a mechanical feedback path comprising mechanical integrating means.

The invention will be understood from the following description read with reference to the accompanying drawings in which:

Fig. 1 presents curves exhibiting certain weighting functions, ideal as well as practicable;

Fig. 2 shows a simple mechanical system according to the prior art for indicating the angular velocity of a rotating shaft;

Fig. 3 shows schematically one embodiment of the present invention; and

Fig. 4 similarly shows another embodiment of the invention.

In all figures, like numerals and letters denote like elements.

It will be convenient to use the notation of the operational calculus to designate the various shaft rotations involved in the apparatus shown in Figs. 2 to 4, inclusive. In this notation $pf(t)$ indicates the time derivative, while $$\frac{1}{p}f(t)$$

indicates the time integral of the function $f(t)$. No more than the results of mathematical analysis will be stated here, for the reason that a mathematical discussion is unnecessary to an understanding of the invention. The angular position of a shaft will be designated by $\theta$, the angular velocity by $\dot{\theta}$ with subscripts where appropriate.

The mechanical transmission circuit beyond the rotating shaft of which the angular velocity is to be indicated, is analogous to an electrical transmission circuit in which the output current equals input voltage multiplied by the steady state transfer admittance, which may be chosen by circuit design to result in an output current proportional to the time derivative of the input voltage. The indicial admittance of the circuit is the weighting function according to which is averaged the output current to represent the best time derivative of the input voltage, which may be varying at a uniform rate plus the superposition of random irregularities.

To solve the problem of mechanical differentiation, one species the desired mechanical indicial admittance, that is, a mechanical weighting function; derives from this the mechanical transfer admittance; and finally designs a mechanical system possessing approximately the transfer admittance desired. In both the electrical and the mechanical case, the ideal solution is foregone for practical reasons.

Referring now to Fig. 1, curves A, B, C and D are weighting functions plotted with weight factor as ordinate against time as abscissa, the unit of time being proportional to the time constant of the averaging mechanical network. This time constant is determined, as later explained, by the gear ratios and motor speeds in Figs. 2, 3 and 4.

In Fig. 1, curve A is the exponential weighting function given by the simple differentiator of Fig. 2. Curve B is the ideal parabolic weighting which is zero at time zero and unity. Curve C is one approximation to curve B, practically realized by the present invention in the embodiment shown in Fig. 3 and curve D is a better approximation than curve C which is realized by the system shown in Fig. 4.

The improvements provided by the present invention are best discussed after a description of Fig. 2, which shows a simple system of apparatus whereby the angular velocity of a rotating shaft may be measured. Shaft 10, turning in the sense indicated by the arrow, occupies momentarily an angular position $\theta_1$ which varies with time at the rate $\dot{\theta}_1$ which is to be determined. Through differential gear 11, shaft 10 drives shaft 12 on which is carried pointer 13, the angular position of which is read on dial 14. From shaft 12 through bevel gears 15 is driven shaft 16 carrying pinion 17 which moves rack 18 to the right, when shaft 16 turns in the indicated direction.

A constant speed motor CSM1, of any known design, drives as indicated disc 20, which through contacting spherical balls 21 turns roller 22 about an axis at right angles to the axis of motor CSM1 at a rotational speed determined by the radial location of balls 21 on disc 20. The axis of roller 22 is prolonged as shaft 23, terminated in spur gear 24 meshing with ring gear 25 of differential 11. Balls 21, which may be of any desired even number, two being shown in Fig. 2, are by any suitable means constrained by the motion of rack 18 to move radially with respect to disc 20 which results in an angular speed of roller 22 proportional to the angular position of shaft 16. The disc and roller system just described may be such as shown in United States Patent 1,317,915, October 7, 1919 to H. C. Ford or in United States Patent 2,002,585, May 18, 1935 to J. J. Rothwell et al. It will at once be recognized that the angular position of shaft 23 changes in any time interval by an amount proportional to that interval multiplied by the radial shift of balls 21 from the center of disc 20; that is, to the rotation of shaft 16, which is the same as that of shaft 12 if gears 15 are of unity ratio. When shafts 12 and 16 through pinion 17 and rack 18 are set to center balls 21 on disc 20, pointer 13 is adjusted on shaft 12 to read zero on scale 14.

Now, if the angular position $\theta_2$ of shaft 12 represents an angular velocity, the rotation of shaft 23 during any time interval is proportional to the time integral of $\theta_2$ over that interval. In terms of the operational calculus, the angular position $\theta_3$ of shaft 23 is $$\frac{1}{p}\theta_2$$

By suitable choice of the gear ratio between gears 24 and 25 a fraction $$a x \frac{1}{p} \cdot \theta_2$$

of this integral may be impressed as a rotation of ring gear 25 just sufficient to offset the rotation of shaft 10, whereupon shaft 12 comes to rest at an angular departure $\theta_2$ from the zero setting above defined. When this comes about no further rotation of shaft 12 takes place. $\theta_2$ read on scale 14 is then the measure of the angular velocity of shaft 10: $\dot{\theta}_1 = p\theta_1 = \theta_2$.

The elements from gears 15 through ring gear 25 constitute an integrating mechanical feedback path between output shaft 12 and input shaft 10. The regulated power supply 30, of any known form, supplies power to drive motor 19, the speed of which may be adjusted by varying resistor 31. The integrator above described is generally designated as 90 included in dashed rectangle 1, Fig. 2.

Whenever a sudden change is brought in the angular velocity of shaft 10 a certain time interval must elapse before shaft 12 turns to the corresponding new steady reading on scale 14. The readjustment of shaft 12 is at first rapid and then more slow. As may be shown by an analysis here omitted, this readjustment obeys the law of curve A of Fig. 1, the exponential weighting function which attaches greatest weight to the earliest information.

Fig. 2 shows also how the angular velocity $\theta_2 = p\theta_1$ may be shown electrically as well as mechanically. Shaft 12 is prolonged to carry brush 32 traversing linear potentiometer 33 supplied with voltage from battery 34, which may be included in power supply 30. Variable resistance 36 may be adjusted to control the scale factor at which voltmeter 35, connected between brush 32 and the grounded end of potentiometer 33, indicates a voltage proportional to $\theta_2$.

A change in velocity of shaft 10 occurs when that shaft is first connected with the apparatus with which an observer is tracking an airplane, for example, and other velocity changes occur when shaft 10 is advanced or retarded by the observer in correcting for overrun or underrun in his observations. In such tracking, the earlier corrections are usually larger than the later, and the earlier of the velocity variations averaged by the system of Fig. 1 are given undue weight by exponential weighting. It is therefore desirable to provide a weighting function approximating the ideal curve B of Fig. 1.

This is done by an elaboration of the simple system, in which again are used the elements included in dashed rectangle 1 of Fig. 2.

To derive a physically realizable approximation to the parabola of Fig. 1, consider the ideal indicial admittance $A_0(t)$ and the correspond-transfer admittance $Y_0(p)$, where $p$ is the differential operator $$\frac{d}{dt}$$

and $p^n$ is the $n$th time derivative $$\frac{d^n}{dt^n}$$

It may be shown that desirably $$A_0(t) = 6t(1-t) \text{ for } t \text{ between 0 and 1} \quad (1)$$
$$= 0 \text{ for } t < 0 \text{ or} > 1,$$

where the theoretical response time of the mechanical circuit is unity. $A_0(t)$ is drawn as curve B of Fig. 1.

The corresponding transfer admittance may be shown to be given by $$\frac{Y_0(p)}{p} = 6 \int_0^t t(1-t) e^{-pt} dt \qquad (2)$$

which may be rewritten $$\frac{Y_0(p)}{p} = \left(1 - \frac{1}{2}p + \frac{3}{20}p^2 - \frac{1}{30}p^3 + \frac{1}{168}p^4 - + \text{etc.}\right)$$

The specific embodiments shown in Figs. 3 and 4 constitute approximations involving the right-hand member of Equation 2 to the second and to the fourth power of $p$, respectively.

Let $$1 - \frac{1}{2}p + \frac{3}{20}p^2 = \frac{1}{1 + b_1 p + b_2 p^2}$$

then $$b_1 = \frac{1}{2} \text{ and } b_2 = \frac{1}{10}$$

so that $$\frac{Y_1(p)}{p} = \frac{20}{3} \cdot \frac{1}{p^2 + 5p + 10} \qquad (3)$$

which may be written $$\frac{Y_1(p)}{p} = \frac{\frac{20}{3}}{\left(p + \frac{5 + i\sqrt{15}}{2}\right)\left(p + \frac{5 - i\sqrt{15}}{2}\right)} \qquad (4)$$

where $$i = \sqrt{-1}$$

The corresponding indicial admittance $A_1(t)$ may be shown to be $$A_1(t) = \frac{40}{3\sqrt{15}} e^{-\frac{5t}{2}} \cdot \sin \frac{\sqrt{15}\, t}{2} \qquad (5)$$

This is the weighting function shown in Fig 1 as curve C.

As another approximation, let $$1 - \frac{1}{2}p + \frac{3}{20}p^2 - \frac{1}{30}p^3 + \frac{1}{168}p^4 = \frac{1 + a_1 p}{1 + b_1 p + b_2 p^2 + b_3 p^3}$$

then $$a_1 = \frac{1}{70}, \; b_1 = \frac{18}{35}, \; b_2 = \frac{3}{28} \text{ and } b_3 = \frac{41}{4200}$$

so that $$\frac{Y_2(p)}{p} = \frac{40}{41} \cdot \frac{p + 70}{p^3 + \frac{450}{41}p^2 + \frac{2160}{41}p + \frac{4200}{41}} \qquad (6)$$

which may be written $$\frac{Y_2(p)}{p} = \frac{40}{41} \cdot \frac{p + 70}{(p + 4.26)(p + 3.36 + i3.57)(p + 3.36 - i3.57)} \qquad (7)$$

leading to the indicial admittance $A_2(t)$, plotted in Fig. 1 as curve D:

$$A_2(t) = 4.732 e^{-4.26t} - (4.732 \cos 3.57t - 1.466 \sin 3.57t) e^{-3.36t} \qquad (8)$$

Stated in its most general form, the relationship of the angular displacement $\theta_2$ of output shaft 12 to $\theta_1$, the angular displacement of shaft 10, Fig. 2, is $\theta_2 = Y(p)\, \theta_1$ and this is analogous to the electrical circuit formula $I = Y(p) E$, in which $I$ is the output current of an electrical network of transfer admittance $Y(p)$ and $E$ is the electromotive force impressed across the network input. By suitable choice of $Y(p)$, the output current may be made proportional to either the time integral or the time derivative of the input voltage, and the same may be done in a mechanical system. The present invention contemplates the latter named relationship between input and output shaft angular displacements.

In the simple differentiator shown in Fig. 2, $$Y(p) = \frac{p}{p + a}$$

and the angular displacement of shaft 12 represents the angular velocity of shaft 10, exponentially averaged.

In any case, where $\theta_2(t) = Y(p).\theta(t)$, it may be shown that the response $\theta_2(t)$ at time $t$ is given by the equation $$\theta_2(t) = \int_{-\infty}^{t} A(t - \lambda)\, \dot{\theta}_1(\lambda)\, d\lambda_1 \qquad (9)$$

where $\lambda$ is time counted from the past from the same point of reference as $t$, and $\theta_1(\lambda)$ is the angular velocity (measured continuously at successive values of $\lambda$) of the shaft having the angular displacement $\theta_1(t)$. The age at time $t$ of the measurement made at time $\lambda$ is written as $\tau = t - \lambda$ and $$\int_{-\infty}^{t} A(t - \lambda)\, \dot{\theta}_1(\lambda)\, d\lambda$$

becomes $$\int_{0}^{\infty} A(\tau)\, \dot{\theta}_1(t - \tau)\, d\tau,$$

where $A(\tau)$ is the weight factor applied to the data of age $\tau$.

If such a weighting function as $A(\tau)$ can be provided, then $$\theta_2(t) = \bar{\dot{\theta}}_1$$

where $$\bar{\dot{\theta}}_1$$

is the weighted average of $$\dot{\theta}_1(\lambda)$$

from $\lambda = -\infty$ to $\lambda = t$, and $$Y(p) = p \int_0^\infty A(\tau)\, e^{-p\tau} d\tau$$

is the transfer admittance determining the final value of $\theta_2$. $Y(p)$ is to be mechanized.

It can be further shown that to be practically mechanized $Y(p)$ must be of the form $$p \frac{M(p)}{N(p)},$$

where $M(p)$ and $N(p)$ are polynomials in $p$ with constant real coefficients. We shall consider the mechanization of the cases where $N(p)$ is either one or two degrees higher in $p$ than $M(p)$.

To put the operational equation $$\theta_2 = p \frac{M(p)}{N(p)} \theta_1$$

into a form suitable for mechanization, it is carried through the following transformations, in steps as follows:

$$\frac{N(p)}{M(p)} \cdot \theta_2 = p \theta_1 \qquad (I)$$

$$\left[ap^2 + b_p + \frac{\overline{N(p)}}{M(p)}\right] \theta_2 = p \theta_1 \qquad (II)$$

where $a = 0$ if $N(p)$ is only one degree higher in $p$ than $M(p)$. $\overline{N}(p)$ is at most of the same degree as $M(p)$. Then $$\left[1+\frac{\overline{N}(p)}{p(ap+b)M(p)}\right]\theta_2=\frac{1}{ap+b}\theta_1 \quad \text{(III)}$$

whence $$\theta_2=\frac{1}{ap+b}\left[\theta_1-\frac{\overline{N}(p)}{pM(p)}\cdot\theta_2\right] \quad \text{(IV)}$$

Now, $$\frac{\overline{N}(p)}{pM(p)}$$

is expanded into partial fractions of which one is of the form $$\frac{1}{p}$$

and the others are each of the form $$\frac{1}{p+a}$$

or $$\frac{p+c}{p^2+(a+b+c)p+ac}$$

Taking $$\frac{1}{p}$$

out in common to all these terms, we have $$\theta_2=\frac{1}{A_1p+B_1}\left[\theta_1-\frac{1}{p}[a+Y_m(p)+Y_n(p)+\text{etc.}]\theta_2\right] \quad (10)$$

In Equation 10 the $Y(p)$'s are each of the form $$Y(p)=\frac{p}{p+a} \text{ or } \frac{p(p+c)}{p^2+(a+b+c)p+ac}$$

The terms $Y_m(p)$, $Y_n(p)$, etc., are all of the form $$p\frac{M(p)}{N(p)}$$

and so introduce no new problems in the design now to be proposed.

When $A_1=0$ and $B_1=1$ and the terms in $Y_m(p)$, etc., are omitted, Equation 10 reduces to the form $$\theta_2=\theta_1-\frac{a}{p}\theta_2 \quad (10')$$

which is the case of the system of Fig. 2. The system of Fig. 3 corresponds to values of $A_1$ and $B_1$ both greater than zero, still omitting $Y_m(p)$, etc. Adding $Y_m(p)$ leads to the system of Fig. 4. Each of the systems of Figs. 3 and 4 establishes a weighting function approximating the ideal parabola, curve B of Fig. 1, and obviously by progressively increasing the complexity of the mechanism the approximation can be carried as far as desired.

Mechanization of such a factor as $$\frac{1}{p+b}$$

obviously involves the generation of $\theta_2$ as the integral of $\theta_4-b\theta_2$, that is, $$\theta_2=\frac{1}{p+b}\theta_4$$

and in the system of Fig. 3 shaft 12, instead of being directly the output shaft of differential 11 is thereto connected through an intervening mechanical integrator of the general form included in dashed rectangle 1 of Fig. 2.

Referring now to Fig. 3, input shaft 10 and output shaft 12 continue to be connected by the feedback path (dashed rectangle 1) entering differential gear 11. The direct connection from differential gear 11 to output shaft 12 is here interrupted to include, in dashed rectangle 2, the intervening integrator mentioned in the preceding paragraph. Opposite shaft 10, output shaft 40 leads to differential gear 41 and therethrough to shaft 42 terminating in bevel gears 43. Through gears 43, shaft 42 drives shaft 44 carrying pinion 45 engaged by rack 46. Rack 46 controls, as does rack 18, an integrating element generally designated as 50 and identically like elements CSM1 to 22 of Fig. 2. Output shaft 51 of integrator 50 drives, through bevel gears 52 and 53, final output shaft 12. The last-named shaft is provided with bevel gears 15 and carries pointer 13 as in Fig. 2. The feedback path between shafts 12 and 10 is identical with that in Fig. 2.

On shaft 12, at the end opposite pointer 13, is carried spur gear 54 meshing with ring gear 55 of differential gear 41. The angular displacement $\theta_2$ of shaft 12 is here related to the angular displacement $\theta_4$ of shaft 40 by the relation $$\theta_2=\frac{1}{p+b}\theta_4$$

Since $\theta_4$ is, as in Fig. 2 for $\theta_2$, equal to $$\left(\theta_1-\frac{a}{p}\theta_2\right)$$

the final displacement of shaft 12 in Fig. 3 is $$\theta_2=\frac{1}{p+b}\left(\theta_1-\frac{a}{p}\theta_2\right)$$

Examination of the diagram of Fig. 3 shows that while the initial effect of the rotation $\theta_4$ is to bring about a proportional angular velocity of shaft 51, the increasing displacement $\theta_2$ of shaft 12 progressively cancels this effect so that integrator 50 ceases to operate simultaneously with the coming to rest of shaft 12, provided the angular velocity $\theta_1$ is strictly constant.

When shaft 12 in Fig. 3 comes to rest, it may be shown that its angular position $\theta_2$ is proportional to the angular velocity $\theta_1$ of shaft 10 weighted substantially in accordance with curve C, Fig. 1. It will be observed that angular position feedback has been introduced from shaft 12 to ring gear 55, in addition to the feedback mechanical integrating path from shaft 12 to ring gear 25. The added path, inclosed in dashed outline 2, is an improvement provided by the present invention; an additional improvement is shown in Fig. 4.

Without detailing the necessary mathematical analysis, it may be stated that the approximation to the parabolic weighting function, curve B of Fig. 1, may be progressively improved by adding any number of admittance paths in parallel with the path between gears 15 and integrator 90 of Fig. 2. Each of these added admittance paths requires the introduction of a differential gear to enable its output to join that from gears 15 to be operated on by integrator 90. It will suffice here to illustrate the addition of one such admittance.

Referring now to Fig. 4, a system providing a weighting function substantially that shown by curve D, Fig. 1, the system of Fig. 3 is elaborated by adding a third integrator included in dashed rectangle 3. Bevel gears 60 transmit the motion of shaft 12 to auxiliary shaft 61, from which bevel gears 62 redirect the motion to enter differential gear 63. The output shaft 64 of gear 63 carries bevel gears 65 whereby is driven rack 68 controlling the integrator generally designated as 70, of like form to the previously described integrators in Figs. 2 and 3. Through bevel gears 72 and 73, and ring gear 74 the output of integrator 70 introduces into differential 63 a motion proportional to the time integral of the motion of shaft 64 and in a sense adapted to check the motion of the last named shaft.

To add the motion of shaft 64 to that of shaft 16, differential 75 is introduced between gears 15 and pinion 17 and rack 18 is moved from above, as in Fig. 2, to below pinion 17. Shaft 64 is prolonged to drive through bevel gears 76, ring gear 77 of differential 75 in the sense to add the motion of shaft 64 to that of shaft 16', the latter driven through differential 75 by shaft 16. The combined motion of shafts 64 and 16' is then integrated by integrator 90, as previously described in connection with Fig. 2, to cancel progressively the motion of the output shaft of differential 11.

In Figs. 2, 3 and 4, full line arrows indicate the final directions of movement of the racks in integrators 90, 50 and 70, when shaft 12 is moving from zero to its final rest position, as indicated by the dashed arrows.

The racks of integrators 50 and 70 initially move as shown by the dashed arrows and then, as shaft 12 approaches its final position, return (full line arrows) to center the transmitting balls on their driving discs if $\dot{\theta}_1$ is constant. The rack of integrator 90 moves only as shown by the full arrow, coming to a final position as shaft 12 does so. It will be noted that the directions of rotation of the discs driven by constant speed motors in all three integrators are the same. It is to be understood that this is only illustrative, and that the motor rotations may be conveniently chosen if regard is had to preserve the sense of the shaft motions as indicated. Further, a little consideration of Fig. 4 will show that as for integrator 50 in Fig. 3, the coming to rest of shaft 12 will be accompanied by the cessation of integrating operation by both integrators 50 and 70 if the motion $\theta_1$ of shaft 10 is strictly uniform with time. Only integrator 90 will in that event continue to operate to make $\theta_2 = p\theta_1 = \dot{\theta}_1$. Since the constant speed motors run continuously, all transmitting balls come to center when shaft 10 is at rest.

The time constant of the system is determined by the various gear ratios and integrator dimensions, together with the speeds of the constant speed motors CSM1, CSM2 and CSM3, and may be chosen at pleasure by adjusting these speeds. It is to be understood that all the constant speed motors may be supplied, by means shown only for CSM1, from power supply 30, Fig. 2. Since the time constant may be thus simply controlled, it is deemed unnecessary herein to prescribe gear ratios and dimensions of parts; these may be chosen as seems convenient to the designer.

Adjacent the important shafts in Figs. 2, 3 and 4 are illustrated their respective angular displacements as $\theta_1$, $\theta_2$, etc. It may be profitable to tabulate the relations of these displacements in the several figures, stating the corresponding weighting functions.

In Fig. 2:

$$\theta_2 = \theta_1 - \frac{a}{p} \cdot \theta_2 \quad = \frac{p}{p+a} \cdot \theta_1$$

weighting function exponential, curve A of Fig. 1.

In Fig. 3:

$$\theta_4 = \theta_1 - \frac{a}{p} \cdot \theta_2$$

$$\theta_2 = \frac{1}{p+b} \cdot \theta_4$$

$$= \frac{p}{p^2 + pb + a} \cdot \theta_1$$

weighting function approximately parabolic, Equation 3, curve C of Fig. 1.

In Fig. 4:

$$\theta_5 = \theta_2 - \frac{a}{p} \theta_5 = \frac{p}{p+a} \theta_2$$

$$\theta_6 = \theta_2 + \theta_5 = \left(1 + \frac{p}{p+c}\right) \cdot \theta_2$$

$$\theta_4 = \theta_1 - \frac{a}{p} \cdot \theta_6 = \theta_1 - \frac{a}{p}\left(1 + \frac{p}{p+c}\right) \cdot \theta_2$$

$$\theta_2 = \frac{1}{p+b} \cdot \theta_4$$

$$= \frac{p(p+c)}{p^3 + Ap^2 + Bp + C} \cdot \theta_1,$$

where $$A = b+c, \ B = 2a+bc, \ C = ac$$

weighting function approximately parabolic, Equation 6, curve D of Fig. 1.

In the above expressions for $\theta_2$, the constants $a$, $b$ and $c$ refer of course to the gear ratios concerned in driving the ring gears.

Obvious modifications in the graduation of scale 14 and in the battery connection to potentiometer 33 can be made to enable the system to indicate angular velocities of shaft 10 in the opposite sense to that shown in the drawings.

Calibration of the system is made by imposing, from any suitable source a known constant angular velocity on shaft 10, the transmitting balls of the several integrators 90, 50 and 70 being centered on their respective driving discs which are in rotation at constant speed. The final position of pointer 13, and the time taken to reach that position, are noted. The disc speeds may be changed if this time is too long or too short, and provision, not shown, may be made to gear up or down the movement of pointer 13. It is obvious from a consideration of Fig. 2, for example, that the higher the speed of disc 20, the less the displacement of shaft 12 for a given angular velocity of shaft 10. If the response time is to be shortened and the scale factor on scale 14 is to be kept the same, pointer 13 must be geared up in the same ratio as the disc speed is increased.

The choice among the systems of Figs. 2, 3 and 4 is to be based on the character of the motion $\theta_1$ of shaft 10. If this motion is uniform with time, the simple system of Fig. 2 will serve. If $\theta_1$ is a motion uniform with time plus random increases and decreases in velocity, the system of Fig. 4 is preferred to that of Fig. 3 unless the additional mechanism is unwelcome. The apparatus of Fig. 4, realizing curve D of Fig. 1, more closely follows the parabola B, and thus provides a more accurate result than does the apparatus of Fig. 3 which corresponds to curve C. Moreover, since curve D reaches zero sooner than curve C, the error due to the curve area beyond $t=1$ is less.

It will be understood that the specific integrating elements shown in integrators 90, 50 and 70 are illustrative only, there being numerous mechanical speed changing systems which may be used, in place of those shown, to produce the same result. In Fig. 2, for example, all that is required is a means for conferring on shaft 23 an angular velocity proportional to the angular displacement of shaft 12 from a zero position, and any means for so doing may replace that shown without departing from the present invention.

For a shaft 10 turning with a gradually varying angular velocity, with or without random irregularities, the invention provides, in the embodiments shown in Figs. 3 and 4, an angular velocity averaged with substantially parabolic weighting over a time interval of selectable length. The speed of the timing discs in the integrators should be set for a response time several times the period of the principal irregularities. The system of the invention then provides a running average angular velocity of the input shaft, smoothing out random fluctuations.

I am aware that mechanical differentiating and smoothing networks, combining differential gears and mechanical integrators, are known. However, the design herein disclosed and based upon the derivation of Equation 10 is believed to include advantages not heretofore realized in such mechanisms. These advantages are:

1. The design is independent of the number of real or conjugate, or both real and conjugate, complex pairs of exponential functions of time which are combined to obtain a satisfactory weighting function.

2. The number of precision parts is also independent of the number of exponential functions.

Since if the angular velocity of shaft 10 is absolutely constant all integrators except that generally designated as 90 eventually return to a neutral position, only integrator 90 needs to be of high precision. In addition, all gears may be of low precision, except, as in Fig. 4, gears 15, differential 75, pinion 17 and rack 18, and precise speed regulation is required only for motor CSM1.

What is claimed is:

1. Mechanism for indicating the angular velocity of a first rotating shaft comprising a second shaft, means including a first differential gearing for driving the second shaft from the first shaft and in the opposite sense of rotation, a third shaft, means including a second differential gearing for driving the third shaft from the second shaft in the sense of rotation of the first shaft, a fourth shaft, means including a mechanical integrator for driving the fourth shaft from the third shaft in the sense of rotation of the second shaft at an angular velocity proportional to the angular displacement of the third shaft, means for introducing from the fourth shaft to the third shaft angular displacement feedback proportional to and in the sense of the angular displacement of the fourth shaft, means including a mechanical integrator connected between the fourth shaft and the first differential gearing for adding to the angular velocity of the second shaft an opposite angular velocity proportional to the angular displacement of the fourth shaft, and means for indicating the last-named angular displacement.

2. A mechanical system controlled by the rotation of a first shaft comprising a second shaft driven through differential gearing from the first shaft, a third shaft driven through differential gearing from the second shaft, a fourth shaft, a mechanical path including integrating means between the third shaft and the fourth shaft, means for introducing angular position feedback from the fourth shaft to the second-named differential gearing and a mechanical feedback path including integrating means between the fourth shaft and the first-named differential gearing, whereby rotation of the first shaft occasions an angular displacement of the fourth shaft proportional to the angular velocity of the first shaft.

3. Mechanism for indicating the angular velocity of a first rotating shaft comprising a second shaft, means including a first differential gearing for driving the second shaft from the first shaft and in the opposite sense of rotation, a third shaft, means including a second differential gearing for driving the third shaft from the second shaft in the sense of rotation of the first shaft, a fourth shaft, means including a mechanical integrator for driving the fourth shaft from the third shaft in the sense of rotation of the second shaft at an angular velocity proportional to the angular displacement of the third shaft, means for introducing from the fourth shaft to the third shaft angular displacement feedback proportional to and in the sense of the angular displacement of the fourth shaft, a fifth shaft, means including a third differential gearing for driving the fifth shaft from the fourth shaft in the opposite sense of rotation, means including a mechanical integrator connected between the fifth shaft and the third differential gearing for adding to the motion of the fifth shaft an angular velocity proportional and opposed to the angular displacement of the fifth shaft, a sixth shaft, means including a fourth differential gearing for imparting to the sixth shaft an angular displacement proportional to the sum of the angular displacements of the fourth and fifth shafts, means including a mechanical integrator connected between the sixth shaft and the first differential gearing for adding to the angular velocity of the second shaft an opposite angular velocity proportional to the angular displacement of the sixth shaft, and means for indicating the angular displacement of the fourth shaft.

4. A mechanical system as in claim 2 including, in addition, a fifth shaft driven through differential gearing from the fourth shaft, a mechanical feedback path including integrating means between the fifth shaft and the last-named differential gearing and means for adding the motion of the fifth shaft to that of the fourth shaft in the feedback path between the fourth shaft and the first-named differential gearing.

RALPH B. BLACKMAN.

REFERENCES CITED

The following references are of record in the file of this patent:

UNITED STATES PATENTS

| Number | Name | Date |
| --- | --- | --- |
| 2,071,424 | Papello | Feb. 23, 1937 |
| 2,089,878 | Corbin | Aug. 10, 1937 |
| 2,136,213 | Hodgman | Nov. 8, 1938 |
| 2,206,875 | Chaffee | July 9, 1940 |
| 2,248,072 | Fry | July 8, 1941 |
| 2,377,898 | Myers | June 12, 1945 |
| 2,426,584 | Baker | Sept. 2, 1947 |
| 2,433,006 | Weiss | Dec. 23, 1947 |
| 2,442,792 | White | June 8, 1948 |